United States Patent [19]

Vezain et al.

[11] Patent Number: 5,060,888
[45] Date of Patent: Oct. 29, 1991

[54] TEMPORARY LINKING DEVICE, ESPECIALLY FOR AN ARTIFICIAL SATELLITE LENGTHENING PIECE, AND METHOD TO FREE SUCH A LINK

[75] Inventors: Gérard Vezain, Mandelieu; Christian Long, Le Cannet; Jean Marchal, Peymeinade, all of France

[73] Assignee: Aerospatiale Societe Nationale Industrielle, Paris Cedex, France

[21] Appl. No.: 530,223

[22] Filed: May 30, 1990

[30] Foreign Application Priority Data

Jun. 9, 1989 [FR] France .................. 89 07667

[51] Int. Cl.$^5$ .............................. B64G 1/64
[52] U.S. Cl. ................. 244/158 R; 244/161; 244/131; 29/447; 403/28; 220/327
[58] Field of Search ............ 244/161, 158 R, 1 R, 244/129.1, 131; 29/447, 426.4, 525.1; 403/11, 2, 32, 28, 337; 220/327

[56] References Cited

U.S. PATENT DOCUMENTS

| | | | |
|---|---|---|---|
| 1,384,915 | 7/1921 | Parks | 220/327 |
| 2,489,984 | 11/1949 | Shoemaker | 244/161 |
| 2,888,292 | 5/1959 | Schoessow | 220/327 |
| 2,910,933 | 11/1959 | Danly | 29/447 |
| 3,187,929 | 6/1965 | Shaw, Jr. | 220/327 |
| 3,244,236 | 4/1966 | Langham | 403/28 |
| 3,582,017 | 6/1971 | Zecca | 244/161 |
| 3,981,467 | 9/1976 | Ludlow | 244/158 R |
| 4,063,831 | 12/1977 | Meuret | 403/28 |
| 4,501,058 | 2/1985 | Schutzler | 29/447 |
| 4,654,192 | 3/1987 | Hutter et al. | 403/28 |

FOREIGN PATENT DOCUMENTS

| | | |
|---|---|---|
| 0081401 | 6/1983 | European Pat. Off. . |
| 0121959 | 10/1984 | European Pat. Off. . |
| 2203470 | 8/1973 | Fed. Rep. of Germany . |
| 2598383 | 11/1987 | France . |

Primary Examiner—Galen Barefoot
Attorney, Agent, or Firm—Pearne, Gordon, McCoy & Granger

[57] ABSTRACT

So as to temporarily connect two elements, such as an artificial satellite lengthening piece and the body of this satellite, a device is used including a holding mechanism (22) of any structure and a freeing member (20) made of a form memory material. The holding mechanism (22) normally applies a holding mechanical tension between the elements. When it is desired to free these elements, the freeing member (20) is heated by, for example, a heating resistor (28) or by using solar energy, until it reaches the transformation temperature of the form memory material. The disposition of the freeing member (20) is such that its change of form suppresses the mechanical holding tension and creates a positive allowance between the elements.

7 Claims, 2 Drawing Sheets

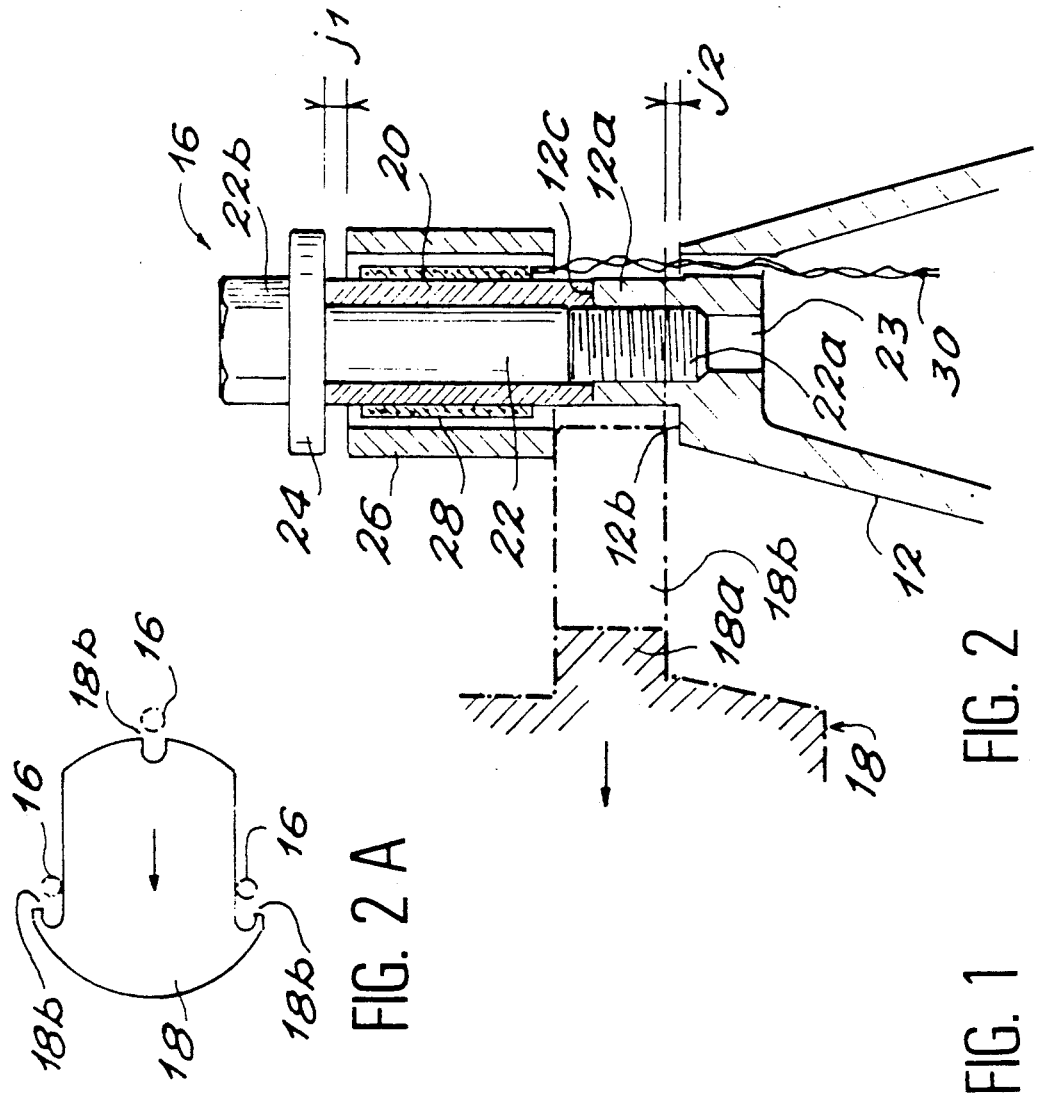
FIG. 2A
FIG. 2
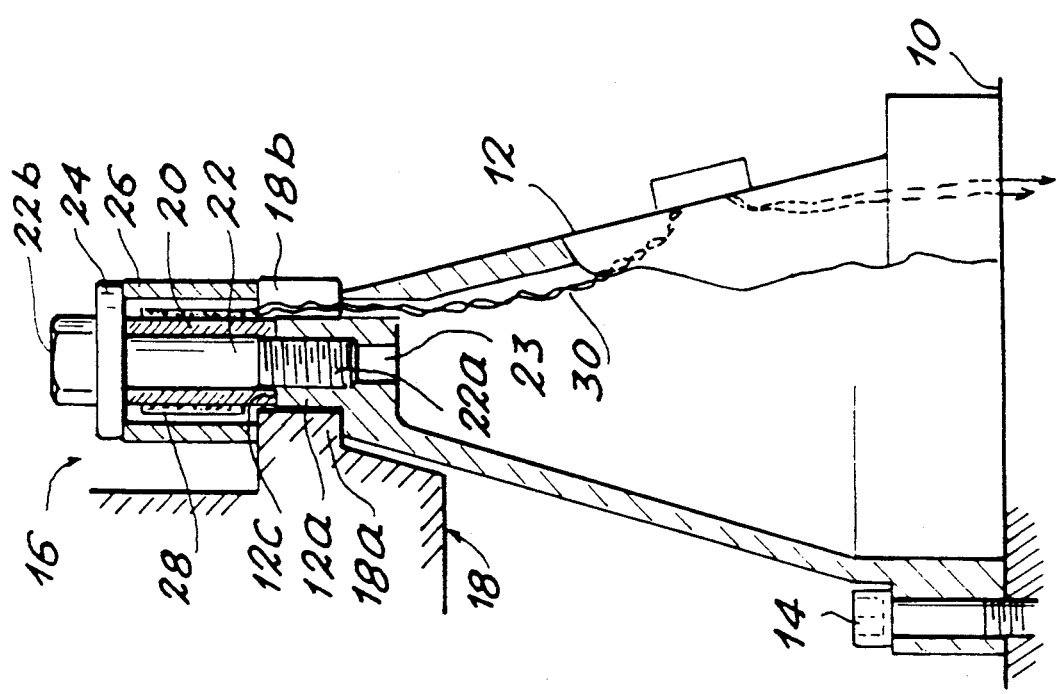
FIG. 1

TEMPORARY LINKING DEVICE, ESPECIALLY FOR AN ARTIFICIAL SATELLITE LENGTHENING PIECE, AND METHOD TO FREE SUCH A LINK

FIELD OF THE INVENTION

The invention concerns a device making it possible to temporarily connect several elements, as well as a method to free these elements.

BACKGROUND OF THE INVENTION

This deivce and method are particularly adapted so as to be used in spatial applications, such as on artificial satellites and orbital stations, to which secured are subsystems or items of equipment, such as antennae or solar panels to be freed after the placing in orbit. The temporary linking device used in spatial applications usually include a holding mechanism which, both before and during orbiting, provides the link between the lengthening piece and the body of the satellite. To this effect, this mechanism applies a mechanical holding tension between the two elements. Depending on the case involved, this mechanism is constituted by either a metallic tension rod or "Kevlar" (registered trade mark) tension rod, or by a tiltable yoke or swivel joined, for example, to the lengthening piece seucred to the satellite.

The temperary linking devices also include means for freeing the holding mechanism.

In the majority of cases, these freeing means include pyrotechnic components. In particular, pyrotechnic shears are usually associated with metallic tension rods to control rupture of said means. Similarly, the swivels are kept in place against the action of a spring by means of a locking mechanism, the latter being freed by either cutting one rod of this mechanism with a pyrotechnic shear, or by a cable activated by a pyromechanism and simultaneously freeing the locking mechanisms of several linking devices.

In "Kevlar" tension rods, the freeing means include a heating resistor encompassing the tension rod so as to control its prolongation or melting.

In existing temporary linking devices, all the freeing means currently have serious drawbacks.

First of all, the pyrotechnic components frequently present a restrictive mass and spatial requirement and induce impacts when used. In addition, the pyrotechnic components strictly need to be sealed so as to avoid polluting the equipment embarked on the satellites, especially when this equipment includes optics. Another drawback of the pyrotechnic components is that they possess extremely limited operating ranges as regards the operating performances and environments, which in each case results in having to develop a new product or provide long and costly qualification additions. The high cost of these components thus limits the number of tests required. Finally, the nature of the pyrotechnic components imposes special precautions needing to be taken at the time they are used and, when a lengthening piece is secured at several points, results in accordingly multiplying the number of pyrotechnic orders on the satellite.

Furthermore, the "Kevlar" tension rod mechanisms freed by means of a heating resistor are expensive and require high electric energy, especially when they are required to melt the tension rod. In addition , the melting of the Kevlar rod may result in excessively polluting adjacent components, for example in optical devices including mirrors or lenses.

SUMMARY OF THE INVENTION

The object of the invention is to provide a temporary linking device comprising a holding mechanism of any type and means for freeing this mechanism, said device and means not having the drawbacks inherent in pyrotechnic components and heating resistors associated with "Kevlar" tension rods.

To this effect, the invention offers a device to temporarily link several elements together and includes a holding mechanism adapte to apply a mechanical holding tension between said elements, and freeing means which, when activated, suppress said mechanical tension and create a positive allowance authorizing a relative movement between the elements, said device being characterized in that the freeing means include a freeing member made of a form memory material and cooperating with the holding mechanism.

The use of a freeing member made of a form memory material makes it possible, by heating this member beyond the structural transformation temperature of the material, to modify its form and/or its dimensions.

Where the holding mechanism includes a tension rod, the change of form of the freeing member may be used to control extending this tension rod, or even break it if the tension rod is provided on a less resistance zone.

When the holding device includes a swivel, the change of form of the freeing member may be used to free the locking mechanism associated with this swivel, for exampel by extending a rod of the locking mechanism until it breaks.

A form memory material is a material having two stable crystalline phases, respectively austenitic and martensitic, depending on whether its temperature is greater or less than the structural transformation temperature characteristic of this material. When the material in the martensitic phase is subjected to a mechanical stress, it is plastically deformed and retains this deformation as long as the temperature remains less than its structural transformation temperature. As soon as the temperature becomes greater than this threshold, the structure once again becomes austenitic and the material resumes its original form.

The use of a freeing member made of a form memory material possesses a large number of advantages compared with current techniques.

Thus, given the fact that this freeing is generated by a physical phenomenon, reliability is one hundred per cent. In addition, a freeing member membodied in this way makes it possible to suppress any impacts and is freed of any pullution problems posed by the use of pyrotechnic components. Furthermore, the use of a form memory material is able to adapt mechanical peroformances (force, etc) to requirements by acting on the dimensions of the freeing member whilst reducing the weight, spatial requirement and price in relation to existing techniques. If required, a mechanical redundancy can be obtained by simply placing in series or inparallel two freeing members in a form memory material. Finally, heating making it possible to obtain change of the state of the material may be obtained, not by using the electric energy of the staellite, but by using solar energy via a suitable orientation of the satellite, which simplifies the implementation means (cabling, etc) and the interfaces.

The object of the invention is also to provide a method to free elements linked together by a holding mechanism, wherein it consists of heating a freeing member made of a form memory material beyond a temperature for the phase change of this material, this freeing member cooperating with the holding mechanism so as to then suppress said mechanical tension and create a positive allowance authorizing a relative movement between the elements.

BRIEF DESCRIPTION OF THE DRAWINGS

One preferred embodiment of the invention, as wall as one variant of this embodiment, is now to be described with reference to the accompanying drawings in which:

FIG. 1 is a longitudinal cutaway view of a temporary linking device conforming to the invention;

FIG. 2 is a view on larger scale of the device of FIG. 1 and illustrating the implementation of the freeing means;

FIG. 2A diagrammatically illustrates the freeing of a satellite lengthening piece fixed by three devices as shown on FIGS. 1 and 2.

DETAILED DESCRIPTION OF THE PREFERRED EMBODIMENTS

Figure 3:
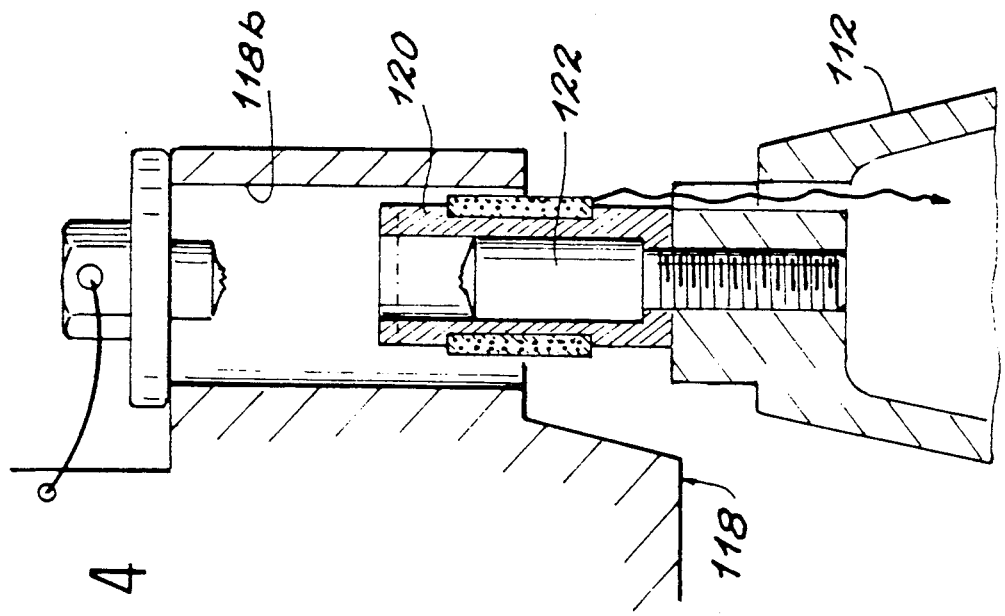
FIGS. 3 and 4 are longitudinal cutaway views representing one variant of the temporary linking device of FIGS. 1 and 2 respectively in the linking position and at the time it is freed.

The reference 10 on FIG. 1 denotes the body of an artificial satellite or of another spatial instrument, such as an orbital station.

At the locations where lengthening pieces, such as antennae or solar panels, need to be temporarily fixed furing the placing into orbit, for example before the latter are deployed, feet 12 are secured to the body 10 by means of screws 14, for example.

A temporary linking device 16 conforming to the invention is placed at the extremity of each of the feet 12. At the time of launching and until the moment it is freed (for example, after the placing in orbit), each device 16 makes it possible to securely hold up a lengthening piece 18, several devices being able to be used to support a given lengthening piece, as illustrated on FIG. 2A.

Each of the temperary linking devices 16 consists of a holding mechanism cooperating with freeing means including a freeing member 20 made of a form memory material in accordance with the invention.

In the embodiment shown on FIGS. 1 and 2, the holding mechanism includes one linking rod constituted by a screw 22 whose threaded extremity 22a is screwed into a tapped hole 23 formed in one cylindrical extremity 12a of the foot 12 and whose head 22b is in support on a flap 18a of the lengthening piece 18 by means of a washer 24 and a tubular brace 26.

More specifically, the flap 18a comprises a hole 18b opened laterally in which the cylindrical extremity 12a of the foot 12 is engaged. When the screw 22 is tightened, the flap 18a is pressed with a mechanical holding tension, corresponding to the tightening of the screw, between the head 22b of the latter and a shoulder 12b formed on the foot 12 at the base of the cylindrical extremity 12a by means of the washer 24 and the tubular brace 26. In these circumstances, the lengthening piece 18 is firmly connected to the body 10 of the satellite.

In the embodiment of FIGS. 1 and 2, the freeing member 20 has the shape of a tubular brace which is disposed around the screw 22 inside the tubular brace 26 so that its extremities are respectively in support under the washer 24 and on the extremity face 12c of the cylindrical extremity 12a of the foot 12. The expression "in support" used here does not exclude that a slight positive allowance, required to ensure isostatism of the link, is able to exist between the brace 20 made of a form memory alloy and the rest of the assembly in accordance with the conditions illustrated on FIG. 1, these conditions corresponding to a case where the temperature is less than the temperature for transforming the form memory alloy in which this brace 20 is embodied.

In order to embody the tubular brace 20, a suitable form memory alloy 20 is selected depending on the use conditions, whilst taking in particular account of the phase change temperature of the alloy. In no way restrictive, amongst the form memory materials able to be used in the invention, these include iron-based alloys (Fe-C, Fe-Cr, Fe-Ni . . . ), copper alloys or alloys with precious metals (Cu-Zn, Cu-Sn, Cu-Al, Cu-Zn-Al, Cu-Zn-Al-Ni, Cu-Al-Ni, Ag-Cd, Au-Cd, . . . ), nickel and-/or titanium-based alloys (Ni-Ti, Ni-Ti-Fe, Ni-Al, . . . ) and certain pure metals (Co, Ti, Na).

In the embodiment shown on FIGS. 1 and 2, the heating of the tubular brace 20 made of a form memory material until said temperature reaches the temperature for transforming this material is effected by a heating device constituted, for example, by an electric resistor 28 placed directly around the brace 20. Electric conductors 30 enable this electric resistor 28 to be connected to an electric power source (not shown) embarked on the satellite by means of a switch (not shown) opened at the time of launching.

When an order to close this switch is issued, the brace 20 made of a form memory material is heated until it reaches a temperature exceeding its structural transformation temperature. The structure of this material thus once again becomes austenitic, which has the effect of enabling it to resume its initial form which, in this case, corresponds to a larger length of the brace 20.

As illustrated on FIG. 2, an adequate dimensioning of the components of the assembly combined with the use of a relatively malleable material for the screws 22 has the effect of elongating the screw 22 between its head 22b and its threaded extremity 22a when the brace is elongated. This elongation is sufficient to suppress the mechanical holding tension initially applied to the flap 18a by the screw 22 and so as to create a positive allowance J1+J2 in the assembly initially linking the flap 18a to the foot 12. Given the fact that the hole 18b is opened laterally, the lengthening piece 18 is accordingly freed, as clearly and diagrammatically shown on FIG. 2A.

In one embodiment (not shown), the heating of the form memory material is effected without using the electric energy of the satellite by orientating the latter after it has been placed in orbit so that the material is then heated by solar energy.

In another embodiment variant illustrated on FIGS. 3 and 4, the general disposition of the assembly is the same as that just described with reference to FIGS. 1 and 2 so that identical or similar members, which are denoted to facilitate comprehension via the same reference figures increased by 100, are not described again.

In this embodiment variant, the hole 118b fomed in the flap 118a is a cylindrical hole which does not open laterally. So that the elongation of the tubular sleeve 120, made of a form memory material and after having been heated by the heating resistor 128, frees the lengthening piece 118, it is therefore essential that this elongation actually breaks the screw 122. To this effect, this screw has in this case a zone of less resistance formed by machining a throat 122d in its section situated inside the sleeve 120.

Figure 4:
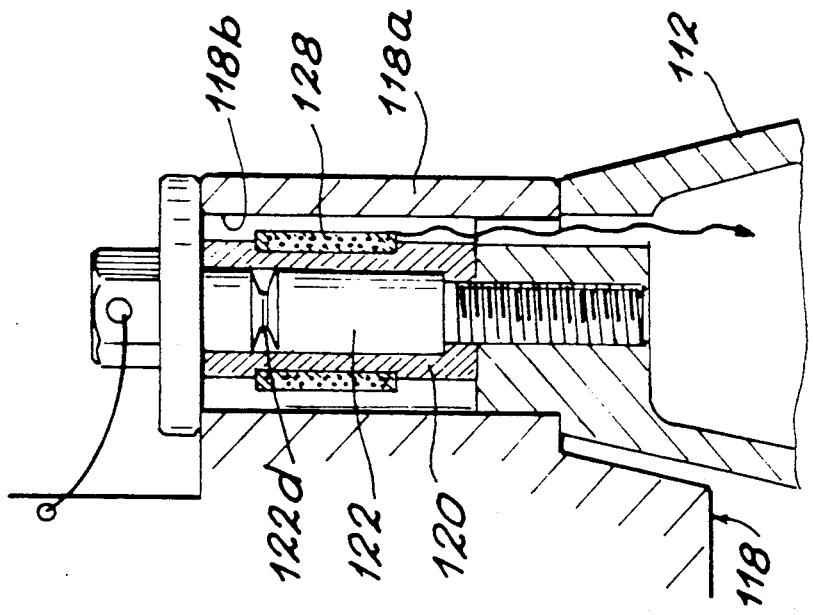

As shown on FIG. 4, the elongation of the sleeve 120 resulting from it being heated then provokes a breakage of the screw 122 at the throat 122d and accordingly the freeing of the lengthening piece 118.

Of course, the invention is not merely restricted to the embodiments described above given by way of examples, but covers all its variants. In particular, it shall be observed that the freeing member made of a form memory material may assume forms widely differing from the tubular sleeve described so as to adapt itself to holding mechanisms with different structures, such as swivel mechanisms. In this latter case, the freeing member may, for example, assume the shape of a hook locking the swivel in a linking position at the time of launching and whose change of form, resulting from the change of phase of the form memory material, automatically frees the swivel.

What is claimed is:

1. A device to temporarily link several elements together, comprising a linking rod normally having a length so that mechanical tension is applied between said elements, and a freeing member made of a form memory material and cooperating with the linking rod and whose activation suppresses said mechanical tension and creates a positive allowance authorizing a relative movement between the elements, said freeing member being disposed in such a way as to provoke a predetermined elongation of the linking rod when the temperature of the freeing member exceeds a phase change temperature of said form memory material.

2. Device according to claim 1, wherein the freeing means further include heating means situated closed to said freeing member.

3. Device according to claim 1, wherein the freeing member has the shape of a tubular brace encompassing said linking rod and inserted between a support surface formed on a first element of said elements and a support surface formed on a first extremity of said linking rod.

4. Device according to claim 3, wherein the linking rod comprises a second threaded extremity screwed into the first element and traverses one projecting section of the second element so as to normally press with said mechanical tension this projecting section between the support surface formed on the first extremity of the linking rod and another support surface formed on the first element.

5. Device according to claim 4, wherein the projecting section of the second element is axially offset on the linking rod, a tubular brace disposed around the freeing member being inserted between said projecting section and the support surface formed on the first extremity of the linking rod.

6. Device according to claim 1, wherein the linking rod has one zone of less resistance adapted to break during the predetermined elongation of the linking rod.

7. Device according to claim 1, wherein said elements inlude a satellite body and a lengthening piece needing to be freed once this satellite has been placed in orbit.

* * * * *

UNITED STATES PATENT AND TRADEMARK OFFICE
CERTIFICATE OF CORRECTION

PATENT NO. : 5,060,888
DATED : October 29, 1991
INVENTOR(S) : Vezain, et al.

It is certified that error appears in the above-identified patent and that said Letters Patent is hereby corrected as shown below:

```
Col. 1, line 13 "deivce" should be --device--;
Col. 1, line 17 "The" should start a new paragraph;
Col. 1, line 18 "device" should be --devices--;
Col. 1, line 27 "seucred" should be --secured--;
Col. 2, line 13 "adapte" should be --adapted--;
Col. 2, line 32 "exampel" should be --example--;
Col. 2, line 52 "membodied" should be --embodied--;
Col. 2, lines 56-57 "peroformances" should be performances--;
Col. 2, line 62 "inparallel" should be --in parallel--;
Col. 3, line 12, "wall" should be --well--;
Col. 3, line 37 "furing" should be --during--;
Col. 3, line 48 "temperary" should be --temporary--;
Col. 6, line 6 "closed" should be --close--.
```

Signed and Sealed this

Thirtieth Day of March, 1993

*Attest:*

STEPHEN G. KUNIN

*Attesting Officer*     *Acting Commissioner of Patents and Trademarks*